United States Patent [19]

Rea et al.

[11] Patent Number: 4,645,023

[45] Date of Patent: Feb. 24, 1987

[54] ALL TERRAIN VEHICLE AND METHOD OF OPERATING SAME

[75] Inventors: Kenneth A. Rea; Alan H. Reynolds, both of Vancouver, Canada

[73] Assignee: Watercraft Offshore Canada Ltd., Richmond, Canada

[21] Appl. No.: 704,427

[22] Filed: Feb. 22, 1985

[30] Foreign Application Priority Data

Mar. 5, 1984 [CA] Canada .................................. 448862

[51] Int. Cl.$^4$ .......................... B62D 55/06; B60D 7/00
[52] U.S. Cl. .................................. 180/9.32; 180/9.44; 280/493
[58] Field of Search ........................ 280/492, 493, 494; 180/9.1, 9.23, 9.32, 9.4, 9.42, 9.44, 9.46, 139

[56] References Cited

U.S. PATENT DOCUMENTS

| | | | |
|---|---|---|---|
| 3,035,654 | 5/1962 | Nuttal, Jr. et al. | 280/492 X |
| 3,215,219 | 11/1965 | Forsyth et al. | 180/9.4 X |
| 3,357,510 | 12/1967 | Jourdan | 180/9.32 X |
| 3,417,832 | 12/1968 | Ziccardi | 180/9.32 X |
| 3,815,683 | 6/1974 | Collin, Jr. et al. | 280/493 X |
| 4,253,536 | 3/1981 | Braathen | 280/492 X |
| 4,445,582 | 5/1984 | Andersson | 180/9.1 X |

FOREIGN PATENT DOCUMENTS

916890 1/1963 United Kingdom .............. 180/9.23

*Primary Examiner*—John J. Love
*Assistant Examiner*—Charles R. Watts
*Attorney, Agent, or Firm*—Carver & Co.

[57] ABSTRACT

An all terrain vehicle has two vehicle units and an articulating link which interconnects the vehicle units in tandem. Each vehicle unit has a body and a pair of spaced crawler tracks which are powered for moving the respective vehicle unit. The articulating link has two longitudinally spaced apart pitch hinge assemblies, each of which cooperates with a respective vehicle unit to permit relative rotation therebetween about a horizontal pitch axis without interference between the vehicle units. Pitch swivelling means associated with one particular pitch hinge assembly can force relative rotation about the particular pitch axis between a particular vehicle unit and the link, so that one vehicle unit can be rotated forcibly relative to the other vehicle unit to negotiate marginal terrain. The remaining pitch hinge assembly can be either freely hinged to permit rotation about the remaining pitch axis or alternatively can have a similar pitch swivelling means. The vehicle also has a yaw hinge assembly for steering, and optionally has a roll hinge assembly to permit relative rotation about the link between the vehicle units, particularly for self-righting on hard terrain, and also for additional control and versatility. A single vehicle unit can be operable independently of the other, but performance is increased considerably by utilizing at least two vehicle units in tandem connected by the articulating link. The vehicle combination can climb up or down vertical walls of limited height from hard terrain, or can negotiate a vertical wall disposed above water a height dependent on draft of the vehicle. The vehicle combination is self-righting from an inverted position on land or immersed in water.

21 Claims, 31 Drawing Figures

ALL TERRAIN VEHICLE AND METHOD OF OPERATING SAME

BACKGROUND OF THE INVENTION

1. Field of the Invention

The invention relates to an all terrain vehicle which is adapted for use on many different types of terrain but particularly for use in transition zones between water and ice, on soft surfaces, such as mud and snow, and negotiating steep walls of limited height.

2. Prior Art

There are many different types of all terrain vehicles, and these types can be classified on the basis of particular types of driven members or surface engaging means, which are dependent on the type of terrain the vehicle is most likely to encounter in normal use. For vehicles that are to be used mostly on hard, steep terrain, endless crawler tracks have been found satisfactory, but vehicles of this type generally have poor water performance if the crawler tracks are to be used as the sole means of propelling the vehicle on water. Commonly, an amphibious crawler track vehicle has an auxiliary water propulsion means, such as a propeller, which is lowered and engaged for use when the vehicle is on water, and raised and disengaged for use when the vehicle is on land. Also, vehicles using crawler tracks for use on hard surfaces commonly suffer from poor soft surface performance, such as encountered when traversing mud or soft snow, usually due to the weight of the vehicle and bearing area of crawler tracks. Commonly, crawler track vehicles have better hill climbing ability than wheeled vehicles due to increased bearing area of the driven member contacting the ground. However, with both tracked vehicles and wheeled vehicles a maximum angle of ascent is reached when the vehicle tends to tip over backwards due to height of the centre of gravity of the vehicle, and torque application to the driven member.

Apart from wheeled and tracked vehicles, many attempts have been made to use air cushion vehicles in marginal terrain, but commonly air cushion vehicles are limited to a shallow angle of ascent or descent, as well as overall surface undulations which must be limited to provide an adequate seal for the skirt that provides the air cushion.

One reason for tracked vehicles having poor water performance is that the upper run of the track, which moves in an opposite direction to the lower run, is commonly immersed in water and this tends to oppose the forward motion generated by the lower run of the track. This resistance to motion can be overcome by locating the upper run of the track above the mean water surface as shown in U.S. Pat. Nos. 2,487,397 issued to Swennes and 2,894,476 issued to Lindgren. The vehicles of these references are limited in their ability to climb from water onto land because, when climbing out of the water, the rear portion of the vehicle tends to sink, thus increasing angle of the vehicle as it attempts to climb on to the land. U.S. Pat. No. 3,842,785, issued to Rivet, discloses an amphibious marsh craft with crawler track supports which provide floatation to reduce sinking of the vehicle in water, but there appears to be no attempt to maintain the upper runs of the crawler tracks clear of the water.

U.S. Pat. Nos. 1,298,366 issued to Macfie, and 3,417,832 issued to Ziccardi, disclose complex mechanisms using articulated multiple crawler track arrangements which are adapted to negotiate severe changes of terrain gradients, such as short vertical walls. However, these vehicles appear to be only for use on land, and furthermore are highly complex and would likely present difficulties when used on soft surfaces or on water.

There are many devices utilizing two body portions supported on wheels etc., the body portions being connected together for swivelling or hinging movement about one or more axes of rotation. Typical devices are found in U.S. Pat. No. 3,057,319, issued to Wagner, U.S. Pat. No. 3,446,175, issued to Boehler et al, and U.S. Pat. No. Re. 27,642 issued to Enos. The body portions of these vehicles can move relative to each other, but it is felt that the wheels or other surface engaging means are inappropriate in very soft surface conditions, such as soft snow, and generally the vehicles likely would have poor climbing ability due to the relatively high centre of gravity of this type of vehicle. Two of the patents show independent propulsion means for propelling the vehicles in water, but these propulsion means require engagement of different driven means and thus would be difficult to utilize in a rapidly changing terrain in which water and ice or other solid materials are mixed together.

Some prior art vehicles with relatively high centres of gravity are prone to rolling about their longitudinal axes when laterally traversing a slope. These vehicles can roll unto their sides or tops and are not capable of regaining an upright position without external means.

SUMMARY OF THE INVENTION

The invention reduces difficulties and disadvantages of the prior art by providing a relatively simple articulated vehicle combination which is designed to negotiate essentially all manner of terrain, including ascending and descending steep slopes and short vertical walls, crossing water, snow, and other commonly encountered soft surfaces. These different types of surfaces can be negotiated without changing the manner of applying a primary driving force to surface engaging means of the vehicle. The vehicle is adapted to negotiate transitions between the surfaces mentioned above, again without changing application of the primary driving force. The vehicle is designed to ascend vertical surfaces of limited height from hard or soft surfaces, or from water, and similarly to descend in a controlled manner such vertical surfaces. Furthermore, the vehicle is designed to be self-righting on land and water, that is, the vehicle has the ability to recover, by itself, from an inverted to an upright position. The vehicle can attain a cruising speed on water, using the same surface engaging means or primary drive means as on land, far in excess of other amphibious vehicles known to the inventor which use the same primary drive means as used on land. Furthermore, the vehicle is of the size and weight which can be transported, without dismantling, in a conventional transport aircraft.

An articulated vehicle combination, according to the invention, has two vehicle units and an articulating link means which interconnects the vehicle units when aligned in tandem along a generally horizontal central longitudinal axis. Each vehicle unit has a body with respective front and rear portions, and each body has a pair of spaced parallel endless crawler tracks having respective upper and lower crawler track runs which are supported and powered for moving the respective vehicle unit. The articulating link means has a link longitudinal axis and longitudinally spaced apart, first and second pitch hinge assemblies cooperating with the first and second vehicle units respectively to permit relative rotation between the vehicle units and the link means about transversely disposed, generally horizontal, first and second pitch axes respectively. The vehicle combination includes pitch swivelling means to apply torque between a particular one of said vehicle units and the articulating link means to force relative rotation about a particular pitch axis associated with the particular one of the vehicle units and the articulating link means. Oppositely facing portions of each vehicle unit have clearance means to permit the vehicle units to rotate in opposite directions relative to the articulating link means so as to swing towards each other without interference between the vehicle units, so as to negotiate marginal terrain. In one embodiment a yaw hinge assembly cooperates with the articulating link means and has a generally vertical yaw axis intersecting the central longitudinal axis. The yaw hinge assembly has a yaw swivelling means to apply torque to the articulating link means to force one vehicle unit to rotate about the yaw axis relative to the articulating link means, so as to permit relative rotation between the vehicle units about the yaw axis for steering. In another embodiment, each body of the vehicle units has upper and lower portions and front and rear main sprocket pairs positioned adjacent the front and rear portions of the body. The front and rear sprocket pairs are rotatable about respective sprockets axes disposed within a fixed plane located approximately midway between the upper and lower portions of the body. In another embodiment, the particular vehicle unit can be forcibly rotated through about 40 degrees relative to the remaining vehicle unit, and the remaining pitch hinge assembly can be freely hinged to permit the remaining vehicle unit to swing through about 90 degrees relative to the articulating link means.

One vehicle unit according to the invention has a body with upper and lower portions, and front and rear portions, with the upper and lower crawler track runs passing adjacent to the upper and lower portions of the vehicle body. A personnel compartment within the body is positioned generally between upper and lower planes containing the upper and lower track runs respectively. The crawler tracks have oppositely facing inner edges which are spaced apart sufficiently to permit a person in the personnel compartment to view between the inner edges. Preferably, the crawler track pairs of the vehicle unit pass around the front and rear main sprockets which are positioned adjacent the extreme front and rear portions of the vehicle. The main sprockets are rotatable about sprocket axes disposed within a plane approximately midway between the upper and lower track runs. A single vehicle unit has an inferior performance when compared with the two vehicle unit combination.

One method of operating the above described articulated vehicle combination is for climbing an obstacle having a steep wall. The vehicle combination has a front and rear vehicle unit and an articulating link means which interconnects the vehicle units as previously described. The method is characterized by powering the tracks of both vehicles for movement in a forward direction, followed by rotating the front vehicle unit relative to the articulating link to cause the front portion of the front vehicle to rise, and concurrently permitting the articulating link to rotate downwardly relative to the rear vehicle unit. Concurrently, both vehicles are driven forwardly so that the crawler tracks of the front vehicle unit engage the obstacle to drive the front vehicle over the obstacle while concurrently being pushed forwardly and upwardly by the articulating link which is pushed by the rear vehicle unit. The vehicles have lower crawler track runs that have upwardly sloping front and rear portions, and the method is further characterized by engaging the obstacle with a front portion of the lower crawler track run when the front portion of the front vehicle unit is raised which assists in drawing the first vehicle upwardly. In this position, the ground can be engaged with the rear portion of the lower crawler track run to assist in driving the front vehicle unit forwardly. When the front vehicle unit has risen a particular height on the obstacle to attain a stable position, the rear vehicle unit is rotated by the articulating link to raise the front portion of the rear vehicle. At this time, the ground can be engaged with the rear portion of the lower crawler track run of the rear vehicle unit to assist in driving the vehicle combination forwardly and upwardly. The above method can be utilized to permit the vehicle to climb from water onto an obstacle having a wall extending from the water. The method can also be reversed to permit the vehicle combination to descend the obstacle.

Another method of operating the articulated vehicle combination according to the invention is for self-righting the vehicle combination which is inverted and immersed in water. The vehicle as above described also has a water tight body with a relatively low centre of gravity when the body is upright, and the method is as follows. From an inverted aligned position in which the vehicle units are aligned with the central axis, at least one particular vehicle unit is rotated relative to the articulating link about the first pitch axis disposed normally to the longitudinal axis. Thus the vehicle bodies are rotated towards each other, causing lower ends of the bodies to be submerged further in the water, while upper ends of the bodies rise upwardly out of the water to attain an unstable inverted raised position. The combination is permitted to fall laterally onto one of its sides, and the particular vehicle unit is rotated in an opposite direction about the pitch axis to attain the aligned position once more in which the vehicle bodies lie on their sides in the water. Because each vehicle unit has a relatively low centre of gravity when in an upright position, a buoyancy force is generated on the vehicle combination due to buoyancy acting through a centre of bouyancy spaced from the centre of gravity, which buoyancy force tends to rotate the vehicle bodies to attain an upright aligned position.

A third method of operating the articulated vehicle combination is for self-righting the vehicle combination on land. For this operation, the vehicle combination has an articulating link assembly with a roll hinge assembly to provide relative rotation about the longitudinal axis between the two vehicle units. From an aligned inverted position in which the vehicle units are aligned with the central longitudinal axis, the method includes forcibly rotating the first vehicle unit relative to the second vehicle unit about the longitudinal axis through half a revolution, so that the first vehicle unit becomes upright. Then the first vehicle unit is forcibly rotated relative to the second vehicle unit about the longitudinal axis through half a revolution, so that the second vehicle unit becomes upright. Prior to rotating the first vehicle unit, it may be necessary to forcibly restrict the second vehicle unit against the rotation as a reaction to rotating the first vehicle unit. Similarly, prior to rotating the second vehicle unit relative to the first vehicle unit, it may be necessary to forcibly restrict the first vehicle unit against rotation as a reaction to rotating the second vehicle unit. A particular vehicle unit can be restricted against undesirable rotation during this manouevre by weight differences between the vehicles, by restraining arms, or by articulating the particular vehicle unit from an aligned position to increase the moment arm of its centre of gravity.

A detailed disclosure following, related to drawings, describes apparatus and methods of one embodiment according to the invention. However, the invention is capable of expression in apparatus and the methods other than those particularly described and illustrated.

DESCRIPTION OF THE DRAWING

FIGS. 16 through 21 are a series of simplified sequence diagrams showing the vehicle combination climbing from water upwards over a vertical walled obstacle.

DETAILED DISCLOSURE

FIGS. 1 through 4

Figure 1:
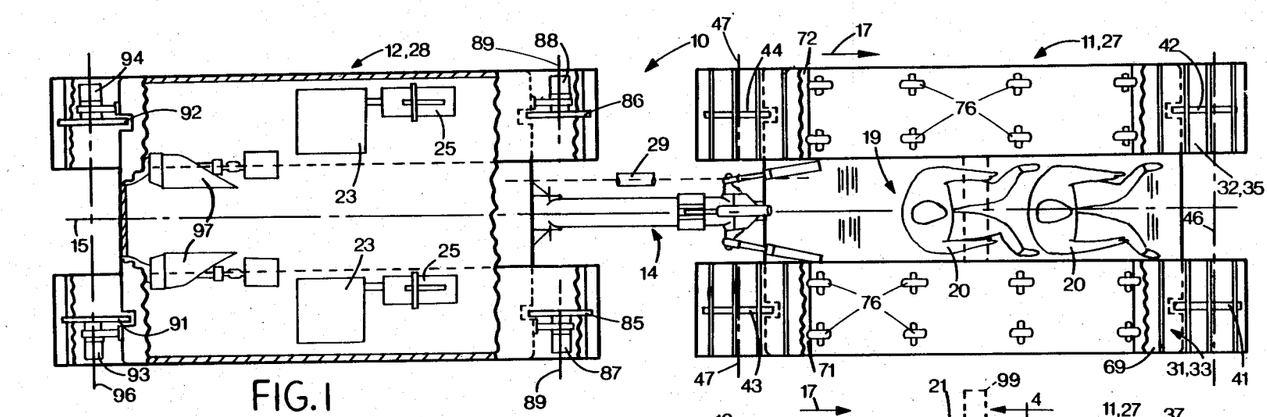
FIG. 1 is a simplified fragmented top plan of an example of an articulated vehicle combination according to the invention, with some portions being omitted for clarity and other portions being removed to show internal detail.
Figure 2:
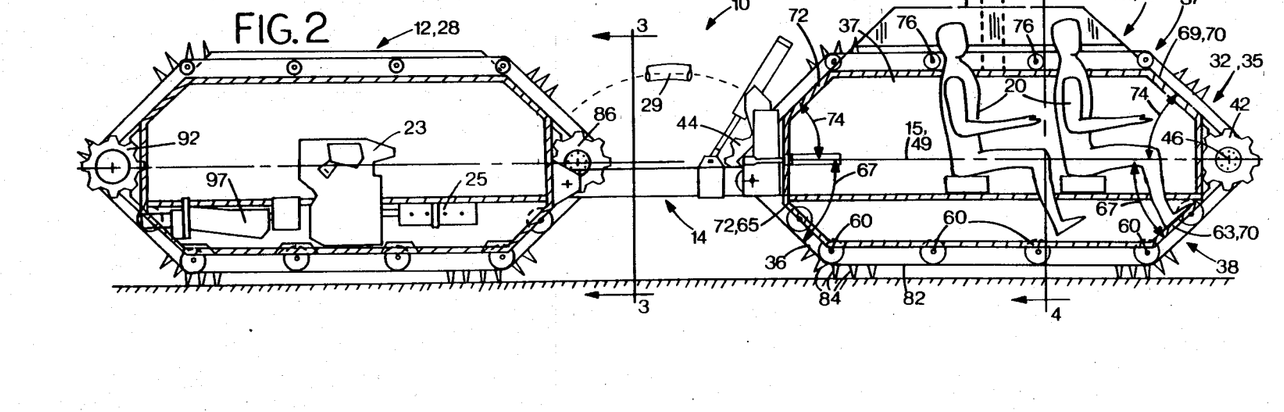
FIG. 2 is a simplified fragmented side elevation of the vehicle combination of FIG. 1, with some portions omitted for clarity and other portions removed to show internal detail.

Referring mainly to FIGS. 1 and 2, on all terrain vehicle according to the invention is an articulated vehicle combination 10 having two vehicle units 11 and 12 and an articulating link means or assembly 14 which interconnects the vehicle units when aligned in tandem along a generally horizontal central longitudinal axis 15. For convenience the vehicles 11 and 12 can be referred to as first and second vehicle units, or front and rear vehicle vehicle units but, because of the symmetry of powering and controlling the combination, either vehicle unit can become a front or a rear vehicle unit depending on the direction of travel, which is shown as an arrow 17. In the embodiment disclosed, the front vehicle unit 11 has a personnel compartment 19 which has two operators 20 disposed in tandem about the axis 15, the compartment having a transparent viewing cover 21 which is removable for access to the compartment. The second vehicle unit 12 has a hydraulic power pack, e.g. twin power units 23 which power conventional respective hydraulic pumps 25 which, through conduits and controls, not shown, power hydraulic motors and actuators as will be described.

The vehicle units 11 and 12 have generally similar bodies 27 and 28, each body having a generally similarly shaped shell which can be made water resistant for full immersion in water, with provisions for operating the power units 23 when so immersed. A main flexible umbilical conduit 29 interconnects the vehicles to provide electrical and hydraulic connections. The vehicle unit 11 will be described briefly, it being understood that the unit 12 is basically similar as regards suspension and power means. In this embodiment the vehicle units differ mainly in that the front unit carries personnel, and the rear unit provides the hydraulic power pack and other means, as required, for propulsion. For some manoeuvres, preferably the front vehicle should be at least 10 percent lighter than the rear vehicle, when both units are loaded normally. In larger alternative embodiments, each vehicle unit can be self-contained as regards personnel, power units and controls etc. but the vehicles would be connected together for simultaneous control to receive benefits arising from the articulated combination. While such vehicle units could be operable as single units, the resulting performance of the single unit would be considerably inferior to that of the vehicle combination.

Figure 4:
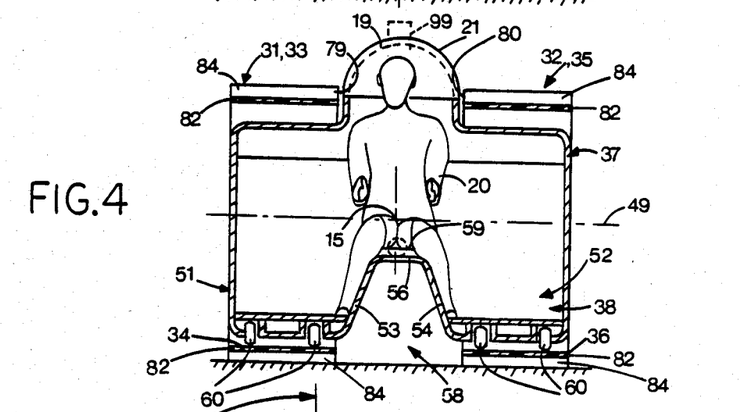
FIG. 4 is a simplified cross-section of the front vehicle unit, as will be seen from line 4—4 of FIG. 2, some portions being omitted.

The front unit 11 has right hand and left hand spaced parallel endless crawler tracks 31 and 32. The crawler track 31 has upper and lower crawler track runs 33 and 34, and the crawler track 32 has upper and lower crawler track runs 35 and 36 as shown in FIG. 4. The upper and lower track runs pass adjacent upper and lower portions 37 and 38 of the vehicle, which are generally symmetrical about the longitudinal axis 15 in both vertical and horizontal planes. The personnel compartment 19 is fitted within the body 27 and positioned generally between upper and lower planes, not shown, containing mid portions of the upper and lower track runs respectively. The crawler track 31 passes around front and rear main sprockets 41 and 43, and the crawler track 32 passes around similar front and rear main sprockets 42 and 44 respectively. The front main sprocket pair 41 and 42 is rotatable about a main sprocket axis 46, and the rear main sprocket pair 43 and 44 is rotatable about a respective main sprocket axis 47, the sprocket axes being parallel and disposed within a horizontal plane 49 which, in FIG. 2, is fixed and coincident with the longitudinal axis 15 and is disposed approximately mid-way between the upper and lower track runs, and thus is approximately midway between the upper and lower body portions.

As best seen in FIG. 4, the lower portion 38 of the vehicle unit has a pair of spaced apart longitudinally extending projections 51 and 52 having oppositely disposed inner walls 53 and 54 respectively. The body has a central lower wall 56 which, with the inner walls of the projections 53 and 54, provides a longitudinally extending tunnel 58 between the projections. As best seen in FIG. 4, the projections are hollow to provide interior space in the personnel compartment so that the operators 20 can sit on a seat 59 mounted on the lower wall 56, with right and left legs fitted within interiors of the supports 51 and 52. Foot controls can be located conveniently near to the feet of the forward person as required. The projections 51 and 52 serve as longitudinally extending track support means which journal a series of free-wheeling rollers 60 which carry the lower track runs 34 and 36 to permit longitudinal movement between the track runs and the body. The projection 52 has upwardly sloping front and rear portions 63 and 65, and the projection 51 has similarly upwardly sloping front and rear portions. The sloping front and rear portions of the projections are inclined at an angle 67, about 45 degrees, to the axis 15, and clearly the lower runs of the track generally follow this angle. Similarly, the upper portion 37 of the vehicle has sloping front and rear portions 69 and 71 for the right hand track 31, and similarly downwardly sloping front and rear portions 70 and 72 for the crawler track 32. The portions 69 through 72 are similarly inclined to the axis 15 at an angle 74, also about 45 degrees, so that the crawler tracks swing through an angle of approximately 90 degrees as they pass around the rear and front sprocket pairs. Horizontal portions of the upper and lower tracks are in parallel planes spaced approximately equally from the axis 15, and thus main portions of the crawler tracks are generally symmetrical about the axis. The upper runs of the tracks are similarly supported by free wheeling rollers 76, which are lighter than the rollers 60 and permit relative movement between the upper runs and the body. As best seen in FIG. 4, the crawler tracks 31 and 32 have oppositely facing inner edges 79 and 80 respectively, which edges are spaced apart sufficiently to permit the operator 20 within the personnel compartment to view between the inner edges so as to obtain axial views from the vehicle. Clearly, portions of the front of the body between the crawler tracks can similarly be transparent for viewing, to enable the operator to view downwardly to the front and rear, as well as forwardly and rearwardly through the viewing cover 21.

The crawler track 32 has a crawler belt 82, which is an elastomeric coated fabric belt having openings to receive teeth from the main sprockets 41 and 43, driven by hydraulic motors, not shown. The belt is provided with a plurality of spaced parallel growser bars 84 which extend across the belt as required and are spaced along the belt to provide grip in soft surface conditions, such as mud and snow, and also have an area sufficient to provide adequate driving force when the vehicle is immersed in water. The growser bars are fitted with a plurality of teeth, not shown, which are adapted to engage hard ice to permit the vehicle to traverse side hills, so as to reduce a tendency of the vehicle to slide down the slope. The teeth are reinforced to reduce damage when traversing hard or rocky ground, and can be replaced when damaged or worn.

The rear or second vehicle unit 12 is generally similar to the first vehicle unit 11 and has similar crawler tracks which pass around similar main sprockets. In FIG. 1, the unit 12 has front main sprockets 85 and 86 with respective fluid motors 87 and 88, and rotate about a sprocket axis 89. Rear main sprockets 91 and 92 are shown with respective fluid motors 93 and 94 which rotate about a sprocket axis 96. Each main sprocket of both vehicles is powered by its own respective similar fluid motor, which can be connected with hydraulic conduits and valves to either or both of the hydraulic pumps, which can be used to supply all or one half of the hydraulic motors, to provide twin engine reliability. Also, flow divider means are provided to permit the main sprockets of one vehicle to be driven at a higher speed than the main sprockets of the other vehicle unit, to provide differential crawler track speeds that might be required for certain operations as will be described. Conventional controls to provide a forward direction to one crawler track and a reverse direction to the other crawler track of the same vehicle are provided for steering purposes, as is common practice with crawler track drives. Also two water jets 97 driven by the hydraulic power pack can be fitted as shown to power the unit 12 which might be necessary in particular circumstances as will be described. In the unit 12 most heavy equipment is located in the hollow spaces of the longitudinally extending projections to attain a low center of gravity. A low center of gravity is important for each vehicle unit.

It is added that, in the event that the vehicle combination becomes inverted so that the normally upper crawler track runs temporaily become the lower crawler track runs, in theory the vehicle could be propelled with a suitable prime mover. This should be unnecessary in view of self-righting procedures as will be described. Clearly in this instance, the transparent cover 21 might be damaged, but properly restrained and protected persons within the personnel compartment should still be able to operate the vehicle when inverted. Alternatively, a vertical post and bridge 99, shown in broken outline for the unit 11 only, could extend upwardly and centrally to prevent the vehicle unit from coming to rest completely inverted. The post could be fitted to both units and would tend to cause the vehicle units to roll onto their sides, as opposed to remaining inverted.

Figure 5:
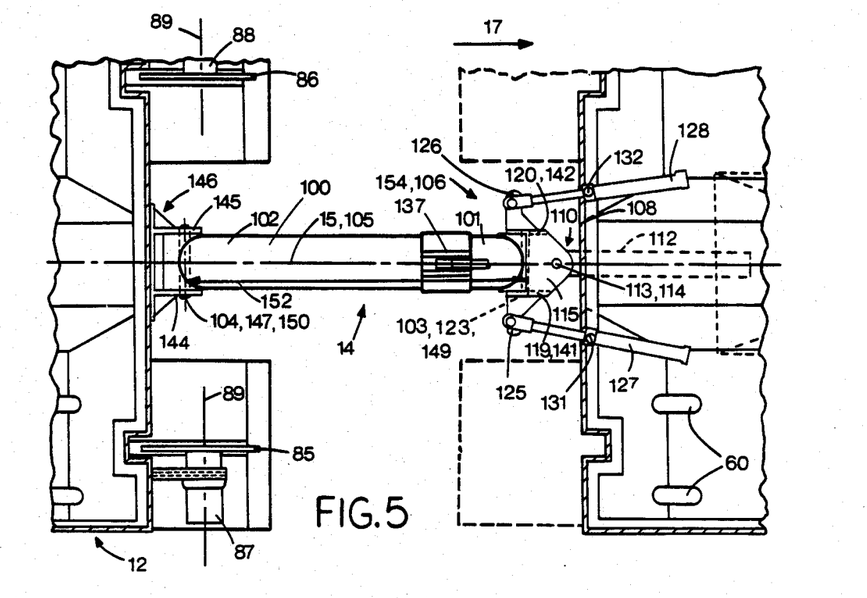
FIG. 5 is a simplified fragmented top plan of an articulating link and associated structure according to the invention, adjacent portions of the vehicle units being shown.
Figure 6:
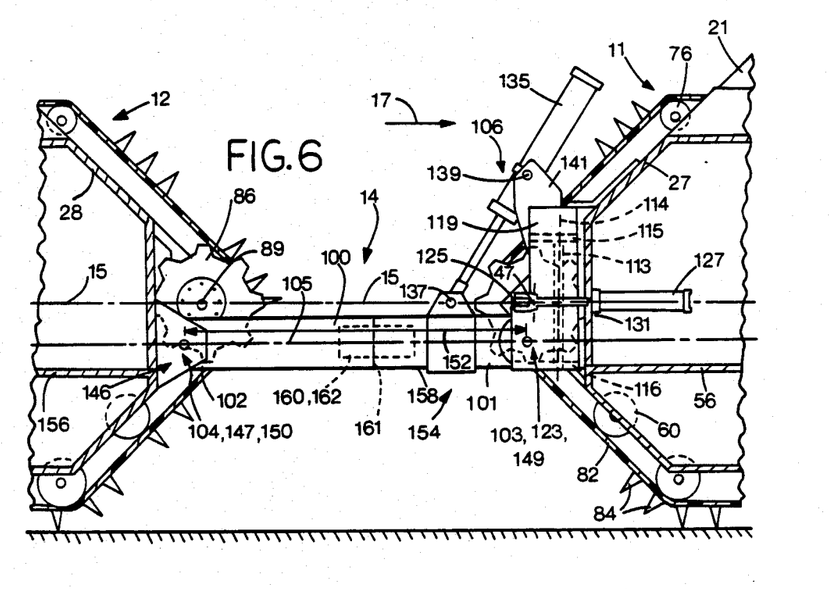
FIG. 6 is a simplified fragmented side elevation of the articulated link and associated structure of FIG. 5, FIG. 7, which appears on Sheet 2, is a simplified side elevation diagram showing a range of movement in a vertical plane of vehicle units swinging about a pair of horizontal pitch axes relative to the articulating link assembly, one pitch swivelling means being fitted.

FIGS. 5 and 6

The articulating link means 14 has an articulating link body 10 having forward and rear ends 101 and 102 provided with first and second pitch journalling means 103 and 104, and a central link axis 105. A steering bracket 106 is secured to a rear portion 108 of the first vehicle unit 11 through a yaw hinge assembly 110 which includes an axially aligned hinge support 112 extending rearwardly from the vehicle unit 11 and a yaw hinge pin 113 disposed vertically and concentrically with a generally vertical yaw axis 114, which is perpendicular to and intersects the axes 15 and 105. The steering bracket has upper and lower horizontal flanges 115 and 116 which are journalled on the pin 113 to permit the steering bracket 106 to swing about the yaw axis 114. Right and left transversely spaced vertical flanges 119 and 120 extend between the upper and lower flanges and carry the pitch journalling means 103, which is a horizontally disposed pin concentric with a first horizontal pitch axis 123, which is perpendicular to and intersects the axis 105. The steering bracket has right hand and left hand steering arms 125 and 126 which are connected to outer ends of piston rods of right hand and left hand steering cylinders 127 and 128, which have cylinder bodies journalled on trunnion mounts 131 and 132 respectively. It can be seen that concurrent extension of one steering cylinder and retraction of the other cylinder swings the steering bracket 106 about the yaw axis 114, concurrently causing relative rotation between the articulating link assembly and the first vehicle unit 11, up to a maximum of 30 degrees on either side of the axis 15, see FIG. 8.

The steering bracket also carries a pitch cylinder 135, see FIG. 6 only, which has an outer end of a piston rod connected to a bracket 137 carried on the articulating link, and has a cylinder body which is trunnion mounted at 139 between a pair of transversely spaced cylinder mounting plates 141 and 142. It can be seen that extension and retraction of the pitch cylinder 135 causes relative rotation between the articulating link means 14 and the first vehicle unit about the first pitch axis 123 which, if the link is stationary, causes the front vehicle unit to pitch. The cylinder 135 has a stroke sufficient to permit swinging or rotation of the vehicle unit 11 relative to the link axis 105 through about 60 degrees on either side of the axis 105 about the first pitch hinge axis 123. In this embodiment, the geometry of the link, brackets and cylinder is such that the unit 11 can rotate preferably approximately equally upwardly and downwardly relative to the axis 105.

Figure 3:
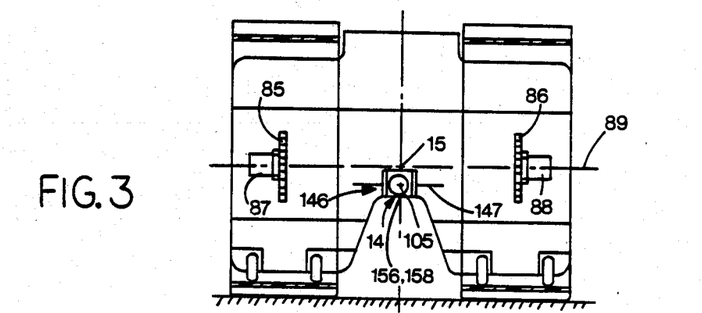
FIG. 3 is a simplified front elevation of the rear vehicle and partial section of the link, as seen from line 3—3 of FIG. 2, some portions being omitted.

The rear end 102 of the articulating link means 14 is fitted between a pair of spaced flanges 144 and 145 of a pitch bracket 146 secured to a front portion of the second vehicle unit 12, as shown also in FIG. 3. The pitch journalling means 104 is a horizontal pin which is concentric with a second horizontal pitch axis 147 and permits free rotation of the vehicle body 12 relative to the link through 90 degrees on either side of the axis 105, see FIG. 7.

In summary it can be seen that the articulating link means has the link longitudinal axis 105 and two longitudinally spaced apart pitch hinge assemblies 149 and 150 which incorporate the first and second pitch journalling means 103 and 104 respectively. Each pitch hinge assembly cooperates with a respective vehicle unit to permit relative rotation between each vehicle unit and the link means about a respective generally horizontal pitch axis 123 or 147, which axis intersects the link longitudinal axis 105 normally. Longitudinal spacing 152 between the pitch axes determines effective length of the articulating link, which is sufficient to permit the vehicle units to rotate through at least about 60 degrees on either side of the link longitudinal axis without interference between the vehicle units, although range can vary. The pitch cylinder 135 serves as pitch swivelling means associated with one particular pitch hinge assembly of one particular vehicle unit which cooperates with the articulating link means. The pitch swivelling means applies torque between the particular vehicle unit and the link means to force relative rotation about the particular pitch axis, that is the axis 123, between the particular vehicle unit, that is the unit 11, and the link means. As will be described with reference to FIG. 7 this enables the particular vehicle unit to be rotated forcibly relative to the remaining vehicle unit through about 45 degrees to negotiate marginal or steep terrain as will be described. The effective length of the link is sufficiently long to permit the vehicles to execute manoeuvres as will be described, but no longer than necessary because unnecessary length increases loads and increases chances of the link interfering with the high points of the terrain. In this embodiment, the remaining pitch hinge assembly 150 freely hinges the remaining vehicle unit, namely the unit 12, relative to the articulating link means to permit the remaining vehicle unit to rotate freely about the remaining pitch axis through, in this instance, 90 degrees on either side of the link longitudinal axis. In an alternative, not shown, a second pitch swivelling means associated with the remaining second pitch hinge assembly 150 and cooperating with the articulating link means 15 can be fitted. Similarly to the cylinder 135, this second means would force relative rotation about the remaining pitch axis 147 between the remaining vehicle unit 12 and the link assembly, to rotate forcibly the remaining vehicle unit through about 60 degrees on either side of the articulating link longitudinal axis. Similarly a steering bracket and associated cylinders and yaw hinge assembly could be substituted for the bracket 146 and associated structure, to provide alternative yaw control for the unit 12, as shown in FIG. 8.

It can be seen that the forward portion of the articulating link means has the yaw hinge assembly 110 which has the vertical yaw axis 114 to permit relative rotation between the vehicle units for steering, with yaw swivelling means associated with the yaw hinge assembly and cooperating with the articulating link. The yaw swivelling means applies torque between the articulating link means and one vehicle unit to force one vehicle to rotate about the yaw axis relative to the remaining vehicle unit. The yaw swivelling means is shown to be the pair of steering cylinders 127 and 128 cooperating with the steering arms 125 and 126, however, an alternative actuator cooperating with the bracket and the adjacent vehicle portion could be substituted to rotate forcibly the bracket 106 about thw yaw axis. Similarly, the pitch swivelling means is shown to be a cylinder 135, however, an alternative actuator cooperating with the steering bracket and the articulating link could be substituted. This alternative would forcibly cause rotation between the link and the bracket about the first pitch axis, and, because the actuator is mounted on the bracket, it can accomodate the rotation of the steering bracket about the yaw axis.

Thus the steering bracket 106 is a portion of a steering and pitch assembly 154 which cooperates directly with the articulating link means and the adjacent vehicle unit 11. The assembly 154 cooperates with the first pitch hinge assembly and the yaw hinge assembly to permit relative rotation between the vehicle units about both the pitch axis and the yaw axis, which rotations can occur concurrently.

As seen in FIGS. 3 and 6, the first and second pitch axes 123 and 147 are disposed below the rear and front sprocket axes 47 and 89, or stated alternatively, the link axis 105 is below the central longitudinal axis 15. As best seen in FIGS. 4 and 6 the central lower wall 56 of the body of the vehicle unit 11, and a corresponding wall 156 of the unit 12 are generally level with a lower surface 158 of the articulating link means 14. Because the central lower walls 56 and 156 in fact represent an effective minimum clearance height for the vehicle, positioning the lower surface 158 of the articulating link at the same level in effect positions the link at a lower-most central location. This link location has a minimal effect on the clearance on the vehicle for passing over uneven terrain. In general, the articulating link becomes more effective for certain applications when it is positioned as low as possible, but this would reduce effective clearance of the vehicle.

The basic vehicle combination as above described provides relative rotation between the vehicle units about a single vertical yaw axis, and a pair of spaced horizontal pitch axes, and thus provides essentially two degrees of freedom of rotation. For certain applications, for example when traversing a slope, or for self-righting, a third degree of freedom of rotation is preferred, namely to provide for rotation of one vehicle unit relative to the other unit about the central link axis 105. This is provided by a roll hinge assembly 160, in which a plane of rotation between the vehicle units is disposed normally to the axis 105 and is shown as a broken line 161. Thus the articulating link can be adapted for relative rotation between its ends about the axis 105, such rotation being effected by a rotary actuator 162 (broken outline) fitted within the articulating link to rotate one vehicle unit relative to the other through a range of approximately 180 degrees, namely from 90 degrees on either side of a mean upright position. The roll hinge assembly 160 thus cooperates with the articulating link means, or if required, with the steering and pitch assembly to permit relative rotation about the central link axis 105 between the vehicle units. The rotary actuator serves as a roll swivelling means associated with the roll hinge assembly. The roll swivelling means applies torque between the vehicle units to force relative rotation about the link longitudinal axis between the vehicle units. Conduits to actuate the rotary actuator 162 pass along a bore of the articulating link to cooperate with the actuator as required through control valves.

OPERATION

FIGS. 7 through 10

Figure 7:
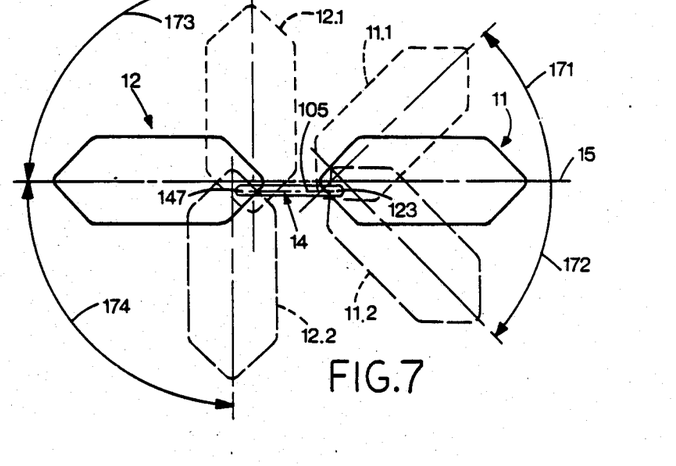
Figure 8:
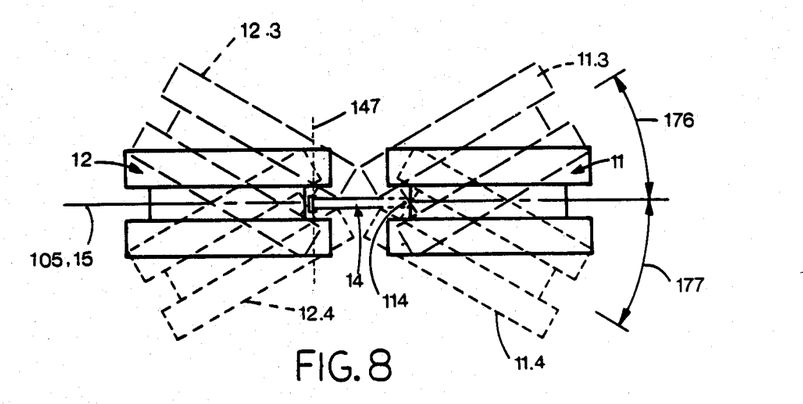
FIG. 8 is a simplified top plan diagram showing a range of movement of the vehicle combination for swinging about one or two vertical yaw axes for steering.

The first and second vehicle units 11 and 12 are shown in FIG. 7 hinged for rotation in a vertical plane relative to the articulating link means 14 about the parallel first and second pitch axes 123 and 147 respectively which extend normally to the link axis 105. The link axis 105 is parallel to and spaced downwardly from the central longitudinal axis 15. For convenience, the axis 15 is considered to be the vehicle datum for the following discussion, and theoretical rotation of ideally supported vehicle units is shown relative to this axis. In the first described embodiment, the unit 11 can be forcibly rotated about the axis 123 through angles on either side of the link axis 105. The units 11 and 12 can attain extreme positions 11.1 or 11.2 which are disposed at angles 171 and 172, on either side of, and relative to the axis 15, the angles being equal to approximately 45 degrees. It is seen that the sloping lower and upper rear portions 65 and 72 of each body provide clearance means to permit the vehicle units to rotate in opposite directions relative to the articulating link means so as to swing towards each other without interference. The vehicle combination can perform best if the angles 171 and 172 are no less than about 40 degrees, although the vehicle would still be operable with a smaller range of swing. The unit 12 is freely hinged and can swing about the axis 147 through angles 173 and 174 to the axis 15 to attain extreme positions 12.1 and 12.2 in which the angles 173 and 174 are approximately 90 degrees. Because the vehicles unit 11 requires support during rotation, the link means 14 freely rotates about the axis 147 as will be described with reference to FIGS. 11 through 20. This increases the range of rotation of the unit 11 relative to the link means 14 to about 60 degrees, which can be on either side of the link axis 105.

Referring to FIG. 8, the articulating link means 14 permits rotation in a horizontal plane of the first vehicle unit 11 about the yaw axis 114 on either side of the axis 15 or 105 through angles 176 and 177, to attain extreme positions 11.3 and 11.4 respectively, in which the angles 176 and 177 are approximately 30 degrees. For simplicity, the second vehicle unit 12 is restricted from rotation in a horizontal plane relative to the link about a vertical axis, and is free to rotate only in a vertical plane about the second hinge axis 147. However, as previously stated, in on alternative, not shown, it may be preferable to rotate forcibly in a horizontal plane the second vehicle unit about the articulating link means 14 by structure similar to the steering and pitch assembly as described. In this alternative, the unit 12 would assume broken outline extreme positions 12.3 and 12.4.

Figure 9:
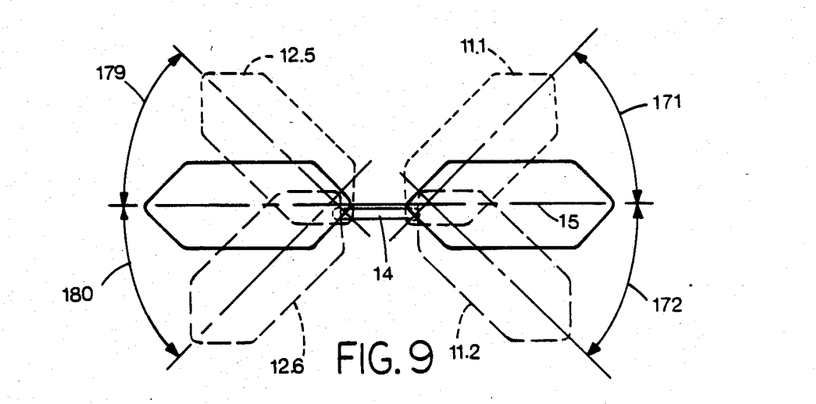
FIG. 9 is similar to FIG. 7 and shows a vehicle combination having an alternative articulating link, with pitch swivelling means for both vehicles units.

Referring to FIG. 9, in another alternative structure the unit 12 is hinged to the articulating link means 14, and is forcibly rotated in a vertical plane relative to the link by a pitch swivelling means similar to that for the vehicle 11. Thus, in this alternative, the vehicle unit 12 can be forcibly rotated through angles on opposite sides of the axis 15. With ideally supported units, the unit 12 can attain extreme positions 12.5 and 12.6 respectively, in which the unit is disposed at angles 179 and 180 to the axis 15, which angles are also equal to approximately 45 degrees. In this alternative the range of motion of the unit 12 is similar to that of the unit 11.

Figure 10:
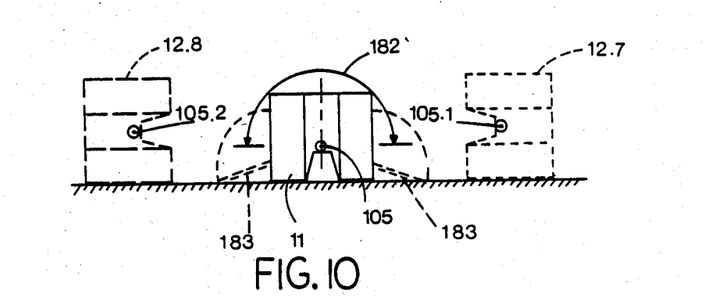
FIG. 10 is a simplified end view diagram showing relative attitudes of the vehicle units following rotation of the first vehicle unit about a roll axis of the articulating link, with alternative roll restraining means being included.
Figure 11:
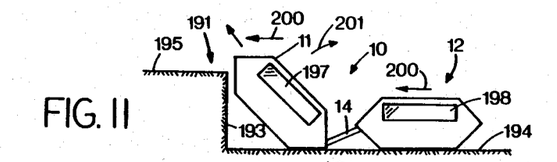
FIGS. 11 through 15 are a series of simplified sequence diagrams for the vehicle combination climbing from a hard surface upwards over a vertical walled obstacle.

Referring to FIG. 10, in an alternative equipped with the roll hinge assembly 160, the unit 11 is assumed to remain stationary and the unit 12 is rolled about the axis 105 through 90 degrees in either direction from a central mean position making a total range of movement of 180 degrees as shown by the angle 182. In a theoretical roll about the axis 15, with both vehicle units being ideally supported, there would be pure rotation about the axis 105 and the new positions of the vehicle unit 12, shown in broken outline as 12.7 and 12.8, would be superimposed on the vhicle unit 11 so that the respective axes 105.1 and 105.2 would be coincident. When the vehicle units are supported on a flat surface, this pure rotation does not take place because there would be a rolling and a vertical displacement of one vehicle relative to the other. The vehicle units are shown separated for clarity with longitudinal axes shown parallel. Also optional roll restraining means 183 are shown extended from the unit 11 as will be described.

FIGS. 11 through 15

The vehicle combination has particular advantages over prior art vehicles which are derived from the articulating link and hinge assemblies which permit the large swings of motion between the vehicle as above described, and the fact that one vehicle can be rotated forcibly relative to the articulating link to attain a particular attitude or angle of inclination relative to the link means and remaining vehicle unit. Also, some of the advantages of the vehicle are attributed to the 45 degree inclination of the forward and rear portions of the lower crawler tracks. This inclination permits traction between the inclined forward and rear portions when the vehicle is inclined at 45 degrees to a surface to improve engagement of the tracks therewith.

Figure 12:
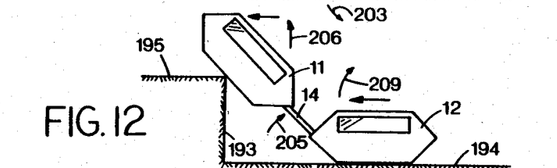
Figure 13:
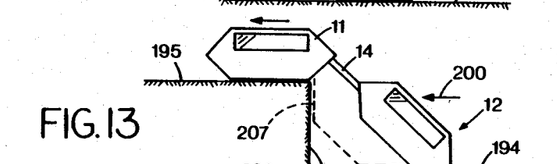
Figure 14:
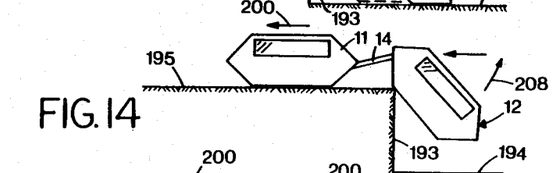

The following describes a method of operating the articulated vehicle combination 10 to negotiate an obstacle 191 which has a vertical wall 193 extending normally relative to lower and upper hard horizontal surfaces 194 and 195 as shown. The vehicle units 11 and 12 are shown in FIGS. 11 to 31 with side mounted transparent operator viewing panels 197 and 198 respectively representing upper portions of the vehicle bodies to designate when the vehicles are upright. From the aligned position as shown in FIG. 2, the tracks of both vehicle units are powered for movement in a forward direction shown as an arrow 200. The method includes rotating the front of vehicle unit 11 relative to the articulating link 14 to cause the front portion of the vehicle unit to rise. This is done by actuating the pitch swivelling means which rotates the front vehicle unit in direction of an arrow 201 until the rear portions of the lower crawler tracks thereof contact the surface 194. Concurrently the articulating link rotates downwardly relative to the rear vehicle unit in direction of an arrow 203. Thus the unit 11 has been forcibly inclined at about 45 degrees to the unit 12, but has swung through about 60 degrees relative to the link means 14. The front portions of the lower crawler tracks engage the obstacle and assist in drawing the front vehicle unit upwardly, and concurrently the front vehicle is pushed upwardly from behind by the articulating link. The front vehicle attains a certain height on the obstacle, with the rear vehicle unit pushing and moving forwardly, as best seen in FIG. 12. The articulating link means 14 has swung in direction of the arrow 205 which further assists in pushing the front vehicle upwards and over the obstacle as shown by an arrow 206. The front vehicle thus rotates about the top edge of the wall 193 and assumes a generally level inclination or stable position on the surface 195 as shown in FIG. 13. Prior to this, the articulating link exerts an upwards force on the rear vehicle unit which is thus rotated in direction of an arrow 209 by the articulating link which raises the front portion of the rear vehicle. In this position shown in FIG. 13, the surface 194 is engaged with the rear portions of the lower crawler tracks of the rear vehicle unit which also assist in driving the vehicle combination forwardly in the direction of the arrow 200. The front vehicle continues to move forwardly in the same direction and the front portions of the lower crawler tracks of the rear vehicle unit similarly engage the obstacle 193, as shown in broken outline at 207 in FIG. 13, to assist in upward movement of the rear unit. Forward movement of the front unit applies an upward force to the link, which, with the front lower portions of the tracks of the rear unit, assist in moving the rear unit upwardly. When the rear vehicle attains the position shown in FIG. 14 where is just surmounting the top of the vertical wall 193, force from the articulating link means 15 draws the rear vehicle forwardly and rotates it rapidly in direction of an arrow 208. The rotation continues until the second rear vehicle is generally horizontal where it can draw itself in direction of the arrow 200 along the upper surface 195.

Thus it is seen that the vehicle combination negotiated or climbed up an obstacle having a verticle wall of a particular height. It is noted that the vehicle unit with the controlled articulation i.e. the pitch and steering assembly, is the front vehicle in this manoeuvre. This also permits the front vehicle unit to correct sideways slipping by actuating the yaw swivelling means. It is considered that the maximum height a vehicle combination of this type can climb up a vertical wall is about 1.5 times height of the body. For a vertical wall and horizontal upper surface, interference occurs between the link and upper part of wall, and this appears to limit the maximum height that can be surmounted with the particular vehicle geometry disclosed.

The above procedure can be reversed by having the vehicle unit 11, as the upper unit, used to lower the vehicle unit 12 slowly down the obstacle, after which the vehicle unit 12 controls the rate of descent of the unit 11. When reversing an obstacle in this nature, it is preferable that the vehicle having the controlled articulation or pitch swivelling means relative to the articulating link is the upper vehicle, that is the last vehicle to descend as shown. In both climbing and descending, preferably the unit 11, or upper unit, is lighter than the unit 12, or lower unit. Also, a low centre of gravity of each vehicle unit aids stability when climbing.

FIGS. 16 through 20

Figures 16, 17, 18, 19:
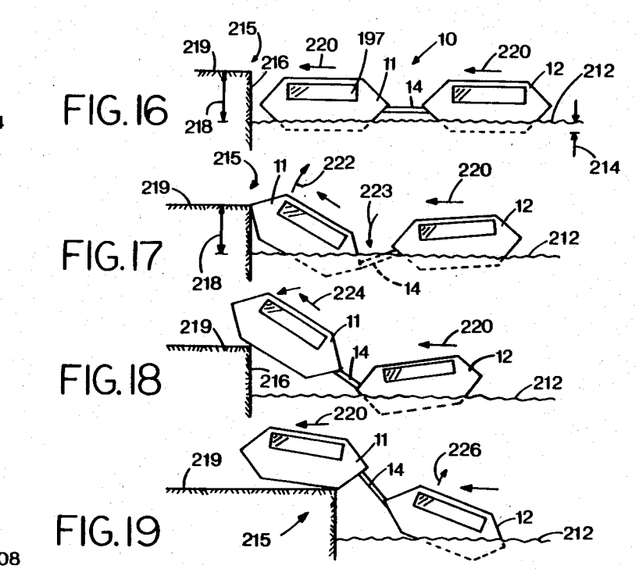
Figure 20:
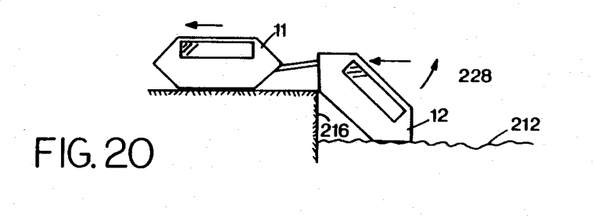

The vehicle combination 10 is shown floating on a water surface 212, the vehicle combination having an average draft 214 as shown. The vehicle is shown approaching an obstacle 215 which has a vertical wall 216 extending a height 218 above the surface of the water to a horizontal hard upper surface 219. Both crawler tracks of the vehicle units are operated to drive the vehicle forwardly in direction of an arrow 220, and when the forwardmost portion of the front vehicle unit 11 contacts the wall 216, the crawler tracks grip and tend to draw the front vehicle unit upwardly. The unit 11 thus rotates in direction of an arrow 222 as shown in FIG. 17, causing the rear portion of the unit 11 to sink or dip. This dipping of the unit 11 swings the articulating link downwardly in direction of an arrow 223, which causes the front portion of the rear vehicle unit 12 to dip slightly as shown in FIG. 17. The pitch swivelling means of the front vehicle unit 11 is concurrently actuated to extend the front vehicle unit upwardly, as seen in FIG. 18, after which the vehicle unit 11 progresses using the front portion of the lower crawler tracks until it attains the upper surface 219 as shown, with the front vehicle traveling in direction of an arrow 224. Concurrently the front portion of the unit 12 dips due to force from the link means 14. During this manoeuvre, power supplied to the tracks of the the second vehicle unit to drive forwardly can be greater than power supplied to the first unit, i.e. the tracks of the second unit move considerably faster than those of the first unit, so that the second vehicle unit can apply sufficient forward thrust to assist the first vehicle in attaining the position shown in FIG. 18. The inherent floatation of the track supports resists a tendency of the vehicle units to pitch in the water, thus maintaining the units essentially level.

To attain greater forward thrust, auxilliary water propulsion means can be operated in the second vehicle, for example the water jets 97, shown in FIGS. 1 and 2, but this might only be necessary for negotiating relatively high obstacles as shown. For normal negotiating of transitions between water and land of almost the same height, i.e. without a high wall, it is considered that the thrust available from the crawler tracks of both vehicles would be sufficient when applying greater power to the rear vehicle unit to assist in the transition.

Figure 15:
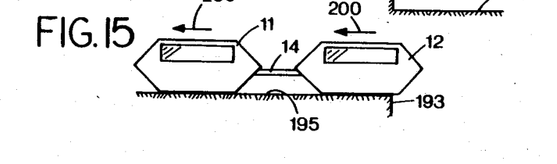

In FIG. 19, the first vehicle has almost attained the surface 219 and proceeds forwardly in direction of the arrow 220, concurrently pulling the second vehicle unit by the articulating link 15. The pull of the link tends to cause the second vehicle unit to rotate in direction of an arrow 226 so that the rear end thereof tends to sink, which is resisted by the floatation. The front vehicle moves forwardly and assists in drawing the rear vehicle unit upwardly over the obstacle until the second vehicle unit attains the position shown in FIG. 20. At this time, similarly to the position shown in FIG. 14, the second vehicle unit rapidly rotates in direction of an arrow 228 and attains a horizontal position level with the surface 219, whereupon it follows forward movement of the first vehicle as shown in FIG. 15.

Similarly to the previous description, the vehicle combination can negotiate the obstacle 215 in reverse, that is the vehicle units can assist each other in lowering themselves onto the water from the obstacle. In each instance of climbing or descending, the method is modified from that of negotiating the same obstacle on land by providing floatation adjacent lower portions of the vehicle. This floatation resists excessive sinking or submerging of the vehicle unit resulting from rotation of the vehicle units relative to the water surface during actuation of the articulating link, or attaining inclined angles to the water surface. The floatation is obtained from the track supports which displace considerable volumes of water and resist excessive sinking of the end portions of the vehicle units. This contrasts with some prior art apparatus which attain steep angles of inclination to the water surface when passing from water onto land, the steep angles resulting from sinking of the rear ends of the prior art apparatus. Similar advantages are gained when entering water from land.

The height 218 of the obstacle has a maximum which is mainly a function of the draft and weight of the vehicle units, and the overall vehicle height. It is considered that an obstacle having a height 218 of about four times the draft 214 can be negotiated using the articulated vehicle combination as above described. Clearly, if the wall 216 was less steep, obstacles of greater height could probably be negotiated.

FIGS. 21 through 25

Figures 21, 22:
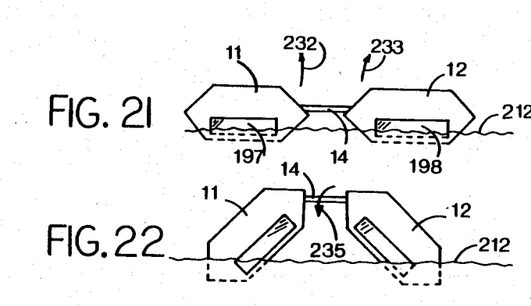
FIGS. 21 through 25 are a series of simplified sequence diagrams showing a self-righting procedure of an inverted articulated vehicle combination immersed in water.
Figure 23:
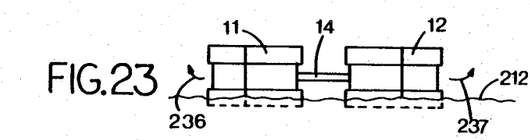
Figure 24:
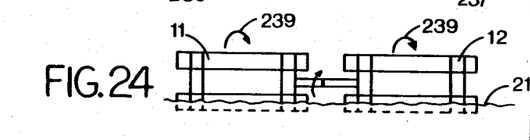
Figure 25:
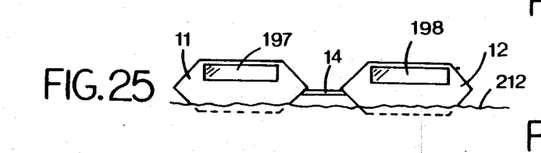

The third method of operating the articulated vehicle combination relates to one of several methods of self-righting the articulated vehicle combination when it is inverted and immersed in water. In FIG. 21, the alternative articulated vehicle unit is shown inverted and has two pitch swivelling means to permit simultaneous forced rotation of each vehicle unit relative to the articulating link. From the inverted position shown in FIG. 21, the vehicle units 11 and 12 are rotated relative to the articulating link about their pitch axes in direction of arrows 232 and 233 respectively, so that the vehicle bodies rotate towards each other, causing ends of the bodies remote from the articulating link to be submerged further into the water, and ends of the bodies adjacent the link to ride upwardly out of the water to attain an unstable exaggerated inverted raised position as shown in FIG. 22. As previously stated, each vehicle unit has a water-tight body provided with a relatively low center of gravity when the body is in an upright position, and thus raising the vehicle combination as shown in FIG. 22 further increases its instability. The inclined combination in the raised unstable position of FIG. 22 is permitted to fall laterally onto one of its sides as shown in FIG. 23 by rotating in direction of an arrow 235. In most situations the vehicle combination would fall onto its side before attaining the exaggerated position of FIG. 22. The vehicle units lie inclined to each other on their sides, and are then rotated in opposite directions relative to the articulating link about their pitch axes in direction of arrows 236 and 237 to attain once again the aligned position in which the vehicle bodies lie aligned on their respective sides in the water. From this position a buoyancy force is generated on the vehicle combination, which force acts through a center of buoyancy spaced from the center of gravity and thus tends to rotate the vehicle bodies about the vehicle axis in direction of arrows 239 to attain an upright aligned position as shown in FIG. 25. The vehicles thus rotate automatically from a position on their sides to an upright position by yielding to the buoyancy force generated by the displacement of the bodies having the low centers of gravity. In some inverted situations, the vehicle combination, and also the single vehicle unit, will self-right automatically due to the buoyancy forces and the low centres of gravity, thus eliminating the need for articulation as above described.

The first embodiment of the vehicle as described in FIGS. 1 to 6 can follow a modification of this procedure. The basic vehicle has one pitch swivelling means for the first vehicle unit and the second vehicle unit is normally freely hinged. In the modified self-righting procedure, only the first vehicle is articulated as described. When articulated, the vehicle combination assumes a position dependent on buoyancy forces and will sink lower in the water than the raised position shown in FIG. 22. This lower position is sufficient to assist in self-righting the vehicle. Also the articulation action can be reversed so that the unstable position is V-shaped. In either method, lower ends of the bodies are submerged further, and upper ends of the bodies rise upwardly out of the water to attain the unstable position.

FIGS. 26 through 31

Figures 26, 27, 28:
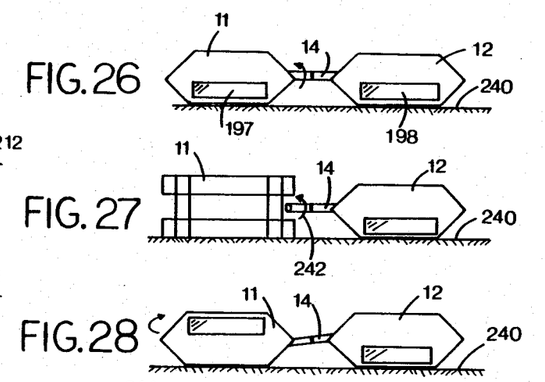
FIGS. 26 through 31 are a series of simplified sequence diagrams showing a self-righting procedure of an inverted articulated vehicle combination on land.

A fourth method of operating the articulated vehicle combination relates to self-righting the articulated vehicle from an inverted position on land. Referring to FIG. 26, the first and second vehicle units are shown inverted on ground surface 240. From the aligned inverted position as shown, the method relates to forcibly rotating the first vehicle unit 11 in direction of an arrow 242 relative to the second unit 12 about the link longitudinal axis through half a revolution, by actuating the rotary 162 actuator of the roll hinge assembly of FIGS. 5 and 6. Assuming that the first vehicle unit is lighter than the second, and has less resistence to rolling, it will roll onto its side as shown in FIG. 27, following a 90 degree rotation of the vehicle about the axis in direction of the arrow 242. In FIG. 28, the forward unit 11 has continued to roll about the axis until it attains an upright position, with the rear unit 12 remaining inverted but rotated slightly about a vertical axis to follow the rolling of the first unit.

The first unit, being lighter than the second unit, generally has a tendency to roll in preference to the second unit when the roll swivelling means is actuated.

Figures 29, 30:
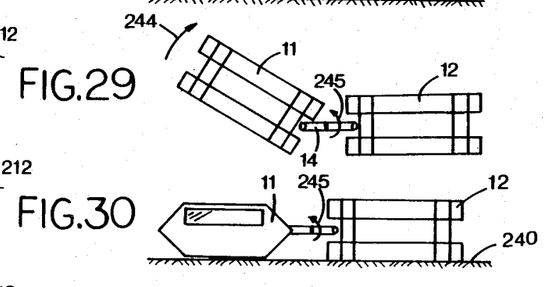
Figure 31:
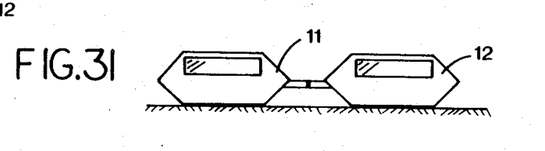

Thus, if the roll swivelling means were to be actuated following the situation shown in FIG. 28, the first unit would likely roll back again to an inverted position with the second unit remaining inverted. The chances of this undesirable rolling happening can be reduced or eliminated by actuating the yaw swivelling means of the unit 11 as follows. FIG. 29 is a top plan view of the vehicle combination following actuation of the yaw swivelling means which has rotated the unit 11 in direction of arrow 244. The unit 11 is now inclined to the link 14 and its centre of gravity is displaced from the link axis to increase moment arm of the center of gravity and thus offers a greater resistance to rolling about the link 14 than the unit 12. Consequently when the roll swivelling means is actuated as shown by an arrow 245 in FIGS. 29 and 30, the second unit rolls in preference to the first unit and attains an upright positions as shown in FIG. 31. The yaw swivelling means is again actuated to align the first unit and the axis, to bring both vehicle units into aligned upright positions.

Thus, in summary the first vehicle unit is forcibly rotated relative to the second unit about the longitudinal axis through half a revolution, so that the first vehicle unit becomes upright. This is followed by forcibly rotating the second vehicle unit relative to the first vehicle unit about the axis through half a revolution, so that the second vehicle becomes upright. Prior to rotation of the second unit, the first unit, which must have the yaw swivelling means, can be inclined at an angle to the articulating link to ensure that the second unit rotates in preference to the first unit.

Alternatively, rotation restricting means can be fitted to the units to restrict the units positively against undesirable rotation about the axis. Such rotation restricting means can be the simple arms 183 of FIG. 10 that can be extended laterally from the vehicle bodies. When the rotation restricting means are used, the method of self-righting the vehicle on land is modified slightly as follows. Prior to rotating the first vehicle unit, restricting the second vehicle unit against rotation as reaction to rotating the first vehicle unit. Again, prior to rotating the second vehicle unit relative to the first vehicle, restricting the first vehicle unit against rotation as a reaction to rotating the second vehicle. This modification may be necessary in some circumstances and can be incorporated in the procedure described above.

We claim:

1. An articulated vehicle combination having:
   (a) first and second vehicle units, each vehicle unit having a body with respective front and rear portions, each body having a pair of spaced parallel endless crawler tracks having respective upper and lower crawler track runs which are supported and powered for moving the respective vehicle unit,
   (b) an articulating link means which interconnects oppositely facing portions of the vehicle units when aligned in tandem along a generally horizontal central longitudinal axis, the articulating link means having a link longitudinal axis and longitudinally spaced apart, first and second pitch hinge assemblies cooperating with the first and second vehicle units respectively to permit relative rotation between the vehicle units and the link means about transversely disposed, generally horizontal, first and second pitch hinge axes respectively,
   (c) pitch swivelling means to apply torque between a particular one of said vehicle units and the articulating link means to force relative rotation about a particular hinge axis associated with the particular one of the vehicle units and the articulating links means,
   (d) the oppositely facing portions of each vehicle unit having clearance means to permit the vehicle units to rotate in opposite directions relative to the articulating link means so as to swing towards each other without interference between the vehicle units so as to negotiate marginal terrain,
   (e) the articulating link means further comprising a yaw hinge assembly and having a generally vertical yaw axis intersecting the central longitudinal axis, the yaw hinge assembly having a yaw swivelling means to apply torque to the articulating link means to force one vehicle unit to rotate about the yaw axis relative to the articulating link means, so as to provide relative rotation between the vehicle units about the yaw axis for steering.

2. An articulated vehicle combination as claimed in claim 1 in which:
   (a) a remaining vehicle unit other than the particular one of the vehicle units is freely hinged to the articulating link means by a remaining pitch hinge assembly of the first and second pitch hinge assemblies, and permits the remaining vehicle unit to rotate freely about a remaining pitch axis of the first and second pitch axes.

3. An articulated vehicle combination as claimed in claim 2 in which:
   (a) the pitch swivelling means is adapted to forcibly rotate the particular vehicle unit through an angle of about 40 degrees relative to the remaining vehicle unit on either side of the central longitudinal axis of the aligned vehicle combination,
   (b) the remaining vehicle can rotate freely through an angle of about 90 degress relative to the articulating link means on either side of the link axis.

4. An articulated vehicle combination as claimed in claim 1 in which:
   (a) the body of each vehicle unit has upper and lower portions which are fixed relative to each other,
   (b) front and rear main sprocket pairs are positioned adjacent extreme front and rear portions of each vehicle unit, the front and rear main sprocket pairs being rotatable about respective sprocket axes disposed within a fixed plane located approximately midway between the upper and lower portions of the body,
   (c) the upper and lower crawler track runs pass along and adjacent the upper and lower portions respectively of the respective vehicle units, and
   (d) the crawler track pairs of each vehicle unit pass around the front and rear main sprocket pairs.

5. An articulated vehicle combination as claimed in claim 1 in which:
   (a) each vehicle unit has a lower portion having longitudinally extending track support means having upwardly sloping front and rear portions and being sealed against leakage to provide flotation when the vehicle combination is immersed in water,
   (b) each vehicle unit has an upper portion having longitudinally extending track support means having downwardly sloping front and rear portions which intersect the upwardly sloping front and rear portions of the lower portions, and are sealed against leakage to provide flotation when the vehicle combination is immersed in water.

6. An articulated vehicle combination as claimed in claim 5 in which:
   (a) front and rear main sprockets are positioned adjacent extreme front and rear portions of respective vehicle units, the front and rear main sprocket pairs being rotatable about respective sprocket axes disposed within a fixed plane located approximately midway between the upper and lower portions of the body.

7. An articulated vehicle combination as claimed in claim 5 further characterized by:
   (a) the track support means being a pair of spaced apart, longitudinally extending projections having spaced apart oppositely disposed inner walls,
   (b) the body having a central lower wall which, with the inner walls of the projections, provides a longitudinally extending tunnel between the projections,
   (c) the crawler tracks having oppositely facing inner edges which are spaced apart sufficiently to permit a person within the vehicle to view between the inner edges, the inner edges also being generally adjacent the inner walls of the projections.

8. An articulated vehicle combination as claimed in claim 7 further characterized by:
   (a) the pitch hinge assemblies cooperating with the respective vehicle bodies so as to position a lower surface of the articulating link means at a position generally level with the central lower wall of the bodies,
   so as to position the link at a lowermost central location.

9. An articulated vehicle combination as claimed in claim 1 wherein:
   (a) the articulating link means further comprises a roll hinge assembly to permit relative rotation about the link longitudinal axis between the vehicle units.

10. An articulated vehicle combination as claimed in claim 9 further characterized by:
    (a) roll swivelling means to apply torque between the vehicle units so as to force relative rotation about the link longitudinal axis between the vehicle units.

11. An articulated vehicle combination having:
    (a) first and second vehicle units, each vehicle unit having a body with respective front and rear portions and upper and lower portions, each body having a pair of spaced parallel endless crawler tracks having respective upper and lower crawler track runs which are entrained about the upper and lower portions respectively of the body and are powered for moving the respective vehicle unit, each body having front and rear main sprocket pairs positioned adjacent the front and rear portions of the body, the front and rear sprocket pairs being rotatable about respective sprocket axes disposed within a fixed plane located approximately midway between the upper and lower portions of the body,
    (b) an articulating link means which interconnects oppositely facing portions of the vehicle units when aligned in tandem along a generally horizontal central longitudinal axis, the articulating link means having a link longitudinal axis and longitudinally spaced apart, first and second pitch hinge assemblies cooperating with the first and second vehicle units respectively to permit relative rotation between the vehicle units and the link means about transversely disposed, generally horizontal, first and second pitch axes respectively
    (c) pitch swivelling means to apply torque between a particular one of said vehicle units and the articulating link means to force relative rotation about a particular pitch axis associated with the particular one of the vehicle units and the articulating link means,
    (d) the oppositely facing portions of each vehicle unit having clearance means to permit the vehicle units to rotate in opposite directions relative to the articulating link means so as to swing towards each other without interference between the vehicle units so as to negotiate marginal terrain.

12. An articulated vehicle assembly as claimed in claim 11 in which:
    (a) the pitch swivelling means is adapted to forcibly rotate the particular vehicle unit through an angle of about 40 degrees relative to the remaining vehicle unit on either side of the central longitudinal axis of the aligned vehicle combination,
    (b) the remaining vehicle unit can rotate freely through an angle of about 90 degrees relative to the articulating link means, on either side of the link axis.

13. An articulated vehicle combination as claimed in claim 11 wherein:
    (a) the articulating link means further comprising a roll hinge assembly to permit relative rotation about the link longitudinal axis between the vehicle units.

14. An articulated vehicle combination as claimed in claim 13 further including:
    (a) roll swivelling means to apply torque between the vehicle units so as to force relative rotation about the link longitudinal axis between the vehicle units.

15. An articulated vehicle combination as claimed in claim 11 further including:
    (a) track support means comprising a pair of spaced apart, longitudinally extending projections having spaced-apart oppositely disposed inner walls,
    (b) the body having a central lower wall which, with the inner walls of the projections, provides a longitudinally extending tunnel between the projections,
    (c) the crawler tracks having oppositely facing inner edges which are spaced-apart sufficiently to permit a person within the vehicle to view between the inner edges, the inner edges also being generally adjacent the inner walls of the projections.

16. An articulated vehicle combination as claimed in claim 11 further including:
    (a) the articulating link means having a yaw hinge assembly having a generally vertical yaw axis which intersects the central longitudinal axis,
    to permit relative rotation between the vehicle units about the yaw axis for steering.

17. An articulated vehicle combination as claimed in claim 16 further characterized by:
    (a) yaw swivelling means to apply torque between the articulating link means and one vehicle unit to force the said one vehicle unit to rotate about the yaw axis relative to the articulating link means.

18. An articulated vehicle combination as claimed in claim 11 further including:
    (a) a yaw hinge assembly having a generally vertical yaw axis.

19. An articulated vehicle assembly as claimed in claim 18 further characterized by:
    (a) the yaw hinge assembly including a steering bracket hinged to an adjacent vehicle portion for rotation of the steering bracket about the yaw axis relative to the vehicle unit, the bracket having a first pitch axis journalling means to journal an end of the articulating link about the first pitch axis,
(b) a yaw swivelling means including an actuator cooperating with the steering bracket and the adjacent vehicle portion to forcibly rotate the bracket about the yaw axis,
(c) the pitch swivelling means includes an actuator cooperating with the steering bracket and the articulating link to forcibly rotate the link relative to the bracket about the first pitch axis and to accommodate rotation of the steering bracket about the yaw axis.

20. An articulated vehicle combination as claimed in claim 18 wherein:
(a) the articulating link means further comprises a roll hinge assembly which permits relative rotation of the vehicle units about the link longitudinal axis.

21. An articulated vehicle combination as claimed in claim 20 further characterized by:
(a) roll swivelling means to apply torque between the vehicle units so as to force relative rotation about the link longitudinal axis between the vehicle units.

* * * * *